Aug. 23, 1960 H. N. SHAW Re. 24,861

STORED HEAT STEAM GENERATORS

Original Filed Dec. 23, 1957 3 Sheets-Sheet 1

INVENTOR.
Harold N. Shaw
BY
Morsell & Morsell
Attorneys

STORED HEAT STEAM GENERATORS

Original Filed Dec. 23, 1957 3 Sheets-Sheet 2

INVENTOR.
Harold N. Shaw
BY
Morsell & Morsell
Attorneys

STORED HEAT STEAM GENERATORS

Original Filed Dec. 23, 1957 3 Sheets-Sheet 3

INVENTOR.
Harold N. Shaw
BY
Morrill & Morrill
Attorneys

United States Patent Office

Re. 24,861
Reissued Aug. 23, 1960

24,861

STORED HEAT STEAM GENERATORS

Harold N. Shaw, Everett, Mass.

Original No. 2,920,179, dated Jan. 5, 1960, Ser. No. 704,768, Dec. 23, 1957. Application for reissue Jan. 26, 1960, Ser. No. 4,842

18 Claims. (Cl. 219—39)

Matter enclosed in heavy brackets [ ] appears in the original patent but forms no part of this reissue specification; matter printed in italics indicates the additions made by reissue.

This invention relates to improvements in stored heat steam generators.

In pressure cookers, sterilizers, and other steam heated devices it is desirable to bring the heating chamber up to pressure as quickly as possible. This is particularly true with frozen foods where once the steam is up to pressure, the cooking time is short, and where slow preheating may more than double the time the food is exposed to the steam. Such lengthy exposure is undesirable as steam leaches out vitamins and other nutrients.

In cases where a pressure cooker is connected to a relatively large boiler, or to a small high pressure boiler, through the use of a reducing valve, the steam can usually be built up to a required pressure in a matter of seconds. Where there is a full load of frozen food a large volume of steam is usually required as it condenses as fast as it enters the cooking chamber, and at least the outer surface of the food must heat up before the rate of condensation slows down enough to allow the steam pressure to rise.

If a boiler is operated at the same pressure as the cooker, the pressure must drop when the steam valve is opened and it will continue to drop until the steam generated by the stored heat in the water equals the steam demand of the cooker. If the apparatus which is being used to heat the boiler is on at the time the valve is opened then this heat input may minimize the pressure drop. Usually, however, by the time the controls have turned on the heat, the boiler pressure has dropped considerably. The larger the boiler and the greater the heat input the less the pressure drop, but with a small boiler the pressure drops to zero almost instantaneously so that the capacity of the heating equipment for the boiler determines the rate of heating of the cooker.

In cases where a boiler is operated at higher pressure than that of the cooker, the cooker may come up to pressure before the boiler pressure has dropped to that of the cooker. Therefore, fast heating results, but a reducing valve is required to allow the boiler to be reheated above the cooker pressure. It is, however, undesirable to operate any equipment at a pressure materially higher than that of the cooker as high pressures are dangerous and there are special code requirements for high pressure boilers which makes them expensive.

It is a principal object of the present invention to provide a steam generator having a source from which heat can be drawn for a quick build up of steam pressure, to which source heat can be delivered while the pressure is being maintained for cooking or other heating operations, whereby heat stored in said source during the cooking or heating operation can be subsequently used for quick preheating of the next batch of food, assuming the device is being used with a pressure cooker.

It is a further object of the present invention to provide a steam generator which draws heat from hot metal rather than from hot water, there being little need to depend on the heat supply while the cooker is being heated up.

A further object of the invention is to provide a device as above described wherein heat is stored in a relatively light mass of metal which has been heated to a temperature several hundred degrees higher than that of steam and above the "critical temperature" at which a film of steam insulates the heating surface from the water to prevent effective steam generation. This "critical temperature" is 45° above the boiling point or about 290° F. for low pressure steam generators. In accordance with the present invention it is desirable to heat the metal to at least 600° F.

A further object of the invention is to provide a device as above described wherein [an upright] *a* metal heating surface[, preferably circular,] is employed, with a stream of water flowing down the surface by gravity so that some steam is generated by the cooled upper part of the surface, and as the descending water approaches the point on the surface where the "critical temperature" line starts, it boils violently and is thrown away from the surface. Any water which falls back into engagement with the heating surface at a point below this line rolls down in the form of balls so that very little steam is generated thereby. With the above arrangement, beginning a short distance above the "critical temperature" line steam generation is very rapid (more than ten times the rate of heat transfer in the average boiler), and this makes it possible to employ hot metal as a heat source in a steam generator.

Inasmuch as a thick metal plate which is kept relatively cold above a predetermined line and very hot below said line would be subjected to severe strains and would probably buckle or crack, it is a further object of the invention to provide a steam generator of the class described having a heating surface with all the advantages of thick metal which is so formed as to eliminate the above objections.

A further object of the invention is to provide a device as above described wherein the metal heating surface is [generally circular in horizontal section and] of relatively compact size, being essentially thin-walled but having relatively heavy lugs integral therewith which are connected to the cylinder in a novel manner so as not to interfere seriously with the shrinkage of the metal as the steaming line advances, thereby giving the advantages of a thick metal cylinder while eliminating dangers from internal strains.

A further object of the invention is to provide a steam generator of the class described having means to insure a uniform flow of water over the heating surface so that the steaming line will advance uniformly around the periphery of the generator.

A further object of the invention is to provide a device as above described having means for feeding the water at a predetermined desirable rate.

A further object of the invention is to provide a steam generator wherein the generated steam is used to blow excess water into a steam separator above the generator for subsequent use as feed water.

A further object of the invention is to provide means for automatically preventing the water valve from feeding water onto the cylinder when the cylinder is not hot enough to generate sufficient steam to blow the excess water off of the bottom. If excess water were permitted to accumulate on the bottom of the device it would continue to boil after the desired pressure had been reached and the safety valve would blow off.

With the above and other objects in view, the invention consists of the improved stored heat steam generator, and all of its parts and combinations, as set forth in the claims, and all equivalents thereof.

In the accompanying drawings, illustrating several embodiments of the invention in which the same reference numerals designate the same parts in all of the views.

Figure 1:
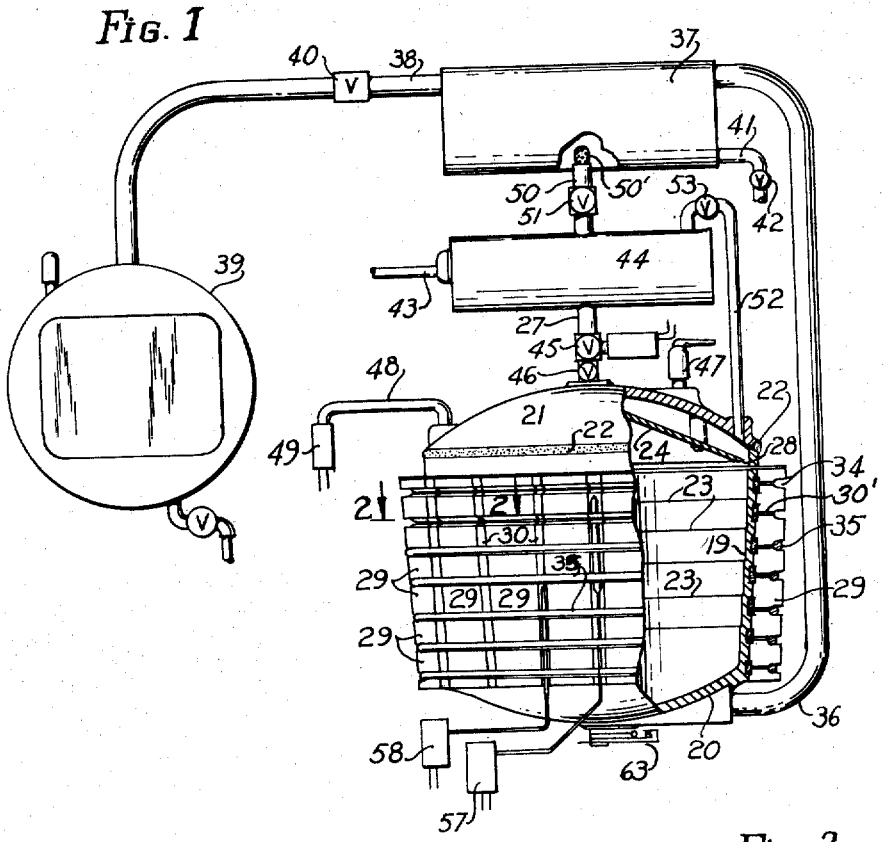
Fig. 1 is a partially diagrammatic view showing a stored heat steam generator as used in conjunction with a pressure cooker, part of the generator being broken away and shown in vertical section.
Figure 3:
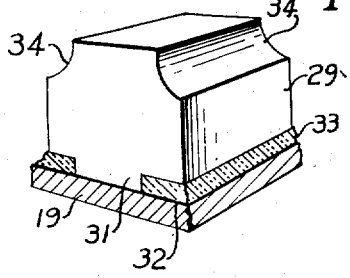
Fig. 3 is a fragmentary perspective view showing one of the lugs which projects from the steam generator.
Figure 10:
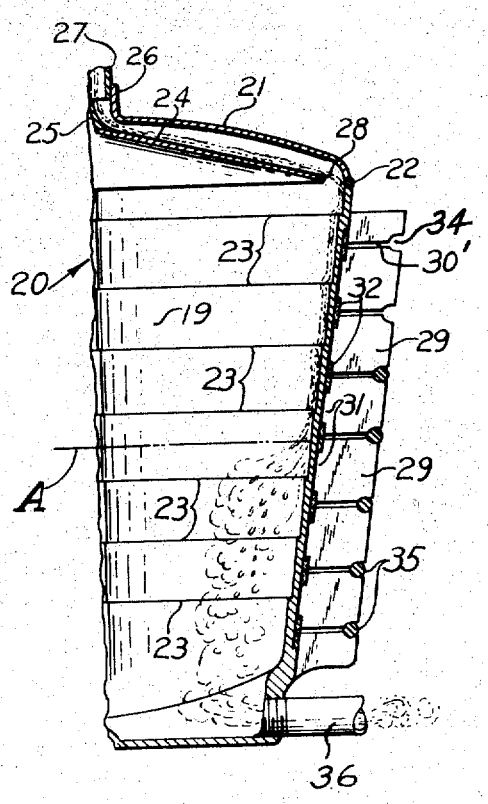
Fig. 10 is a fragmentary vertical sectional view of the generator of Fig. 1 on a larger scale to show the action at the "critical temperature" line.

Referring more particularly to Figs. 1, 3 and 10 of the drawing, this form of the device includes a cup shaped receptacle 20 of metal, preferably aluminum, closed by a head 21. The head is preferably welded to the top of the receptacle by an annular line of weld 22 within a V groove as shown. The side wall 19 of the receptacle which constitutes a steam generating surface is circular in horizontal cross section, and the wall tapers inwardly somewhat in a downward direction. The interior surface of the side wall is stepped to provide annular ledges 23.

Suitably supported from the top 21 is a conical water spreader 24 having a central spreader cone 25 which projects into the water inlet bushing 26. With this arrangement water entering through the water inlet pipe 27 is spread by the cone 25 so that it flows over all portions of the conical spreader surface 24. The water then falls off of the annular edge 28 of the spreader in an annular sheet and is directed simultaneously against all upper portions of the interior of the side wall of the heat generator. This water is adapted to cascade down the wall from one step 23 to another as shown particularly in Fig. 10.

Figure 9:
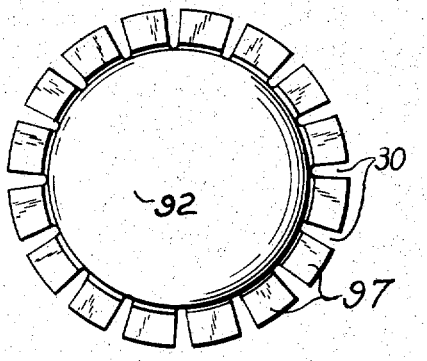
Fig. 9 is a view looking at the bottom of the generator of Fig. 8 with the burner removed.

Cast integrally with the sides of the receptacle 20 are annular horizontal rings of lugs 29. One ring of lugs is shown in Fig. 9 where it is apparent that the lugs are separated from each other by vertical radial slots 30. The lugs of one ring are separated from the lugs of an adjacent ring by an annular horizontal space or slot 30'.

Referring more particularly to Fig. 3, each lug is generally T-shaped and is connected to the wall 19 by a relatively narrow neck portion 31 which is integral with the wall. A slot 32 which extends from the upper portions of the necks of one ring of lugs to the lower portions of the necks of the ring of lugs there-above is formed by casting with asbestos 33 therein. The outer corners of adjacent rings of lugs are machined out as at 34 to provide annular grooves for receiving annular rod-type heating elements 35. The latter are omitted from the upper two grooves of Figs. 1 and 10 in order to show the grooves more clearly. The horizontal slots 30' between rings of lugs allow the lugs to move independently as the receptacle shrinks at the steaming line. The vertical radial slots 30 divide the rings of lugs into relatively short lug units so as to eliminate any strains resulting from the lugs being hotter than the receptacle proper. Any heat from a lug must flow through the relatively narrow neck 31 into the cylinder.

In Fig. 1 an outlet line 36 for wet steam connects with a steam separator 37, the latter being connected by a dry steam pipe 38 with a pressure cooker 39, there being a steam valve 40 in the line. The function of the steam separator is to provide a large cross-section so as to reduce the steam velocity to a point where the water is allowed to settle out so that relatively dry steam is delivered to the cooker 39, the separator also providing water for the feed tank 44. The wet steam line 36 carries the excess water which is blown off of the generator bottom by the high velocity steam. The steam valve 40 provides means for closing the steam outlet when the heating operation is completed. A drain line 41 extends from the bottom of the steam separator and has a sediment drain valve 42 therein. A water feeder 43, from any suitable source to provide make-up water, feeds into a hot water feed tank 44 from the bottom of which the inlet line 27 leads to the top of the generator, there being a solenoid valve 45 in the line 27 and a throttling valve 46 below the solenoid valve.

The top 21 of the steam generator has a safety valve 47 fitted therein and there is also a line 48 connecting the interior of the steam generator with a pressure control switch 49.

A conduit 50 connects the bottom of the steam separator with the top of the hot water feed tank, there being a one-way check valve 51 in said line to prevent steam leaving tank 44. The upper end of the pipe 50 is provided with a perforated strainer 50' above the bottom of the separator tank to prevent sediment from flowing to the feed water tank 44. A vacuum breaker line 52 leads from the interior of the steam generator to the top of the hot water feed tank, there being a one-way check valve 53 in said line to prevent steam leaving tank 44.

Figure 4:
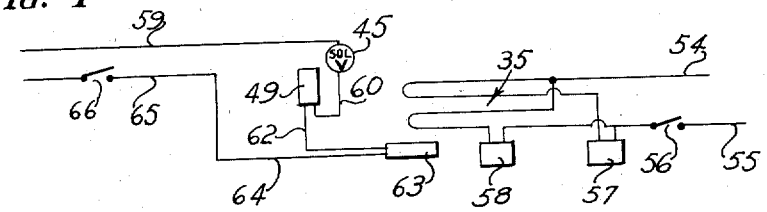
Fig. 4 is a wiring diagram showing the hook up for the equipment of Fig. 1.

Referring now to the wiring diagram of Fig. 4, wires 54 and 55 leading from a suitable source of current, supply electricity to the heating element 35 which is around the steam generator receptacle 20, there being a switch 56 in the line 55. Also connected to the lines 54 and 55 is a heater thermostat 57, and another heater thermostat 58 is inserted in the line 55. A wire 59 extending from a suitable source connects with one side of the solenoid operated valve 45 in the water inlet line to the steam generator. The other side of the solenoid operated valve 45 is electrically connected by a wire 60 with one side of the electrically operated pressure control switch 49. The other side of said switch is connected by a wire 62 with one side of a low temperature thermostat 63. The other side of the thermostat 63 is connected by a wire 64 with the other source wire 65 there being a switch 66 in the line 65.

A thermostat 63 is connected to the bottom of the steam generator and is adapted to open when the receptacle is cold and to close when the receptacle is hot.

Figure 5:
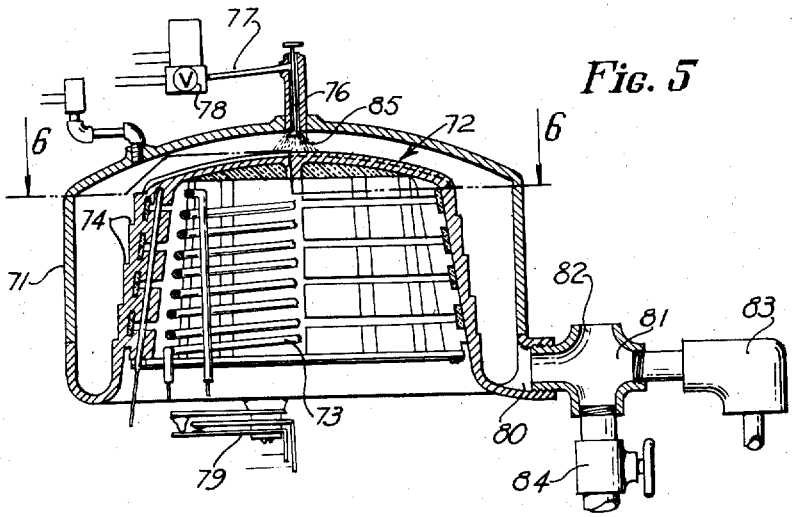
Fig. 5 is a vertical sectional view through a modified form of steam generator with associated equipment, the conduit and electric lines being broken away.

In the modification of Fig. 5 the steam generator 71 has a bottom projecting upwardly in the form of an inverted cup 72 which is the reverse of the construction of Fig. 1 in that the heating element 73 is on the inside wall of the inverted cup 72, and the outside wall of the latter is stepped to provide annular ledges 74 which function the same as the annular ledges 23 of the principal form of the invention. In this form of the invention feed water enters through a line 77 under control of a needle valve 76, the water entering from line 77 under control of a solenoid valve 78 which has the same purpose as valve 45 of the form of the invention of Fig. 1. On the bottom of the generator is a thermostat 79 which functions the same as the thermostat 63 of the principal form of the invention. At the bottom of the device is a steam outlet 80 which passes into a fitting 81 having a branch 82 that is to be connected to the steam line of the cooker. Another line from the fitting 81 may lead to a thermostatic steam trap 83 to drain off excess condensation. Another line leads to a drain valve 84 for clean-out purposes.

Figure 6:
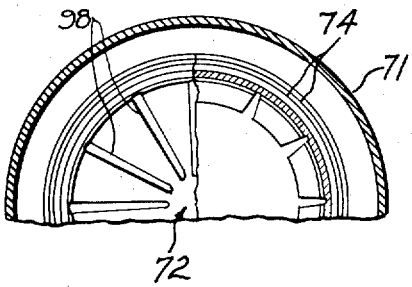
Fig. 6 is a fragmentary irregular sectional view taken on the line 6—6 of Fig. 5.

Water which is admitted to the top of the steam generator of Fig. 5, through the inlet pipe 77, is directed uniformly over the upwardly dished top of the steam generator 72 by a cone 85 which is on the bottom of the needle valve 76. The water will flow uniformly down the exterior of the heating surface throughout its circumference to cascade from one step 74 to another, uniform flow being assured by the radial ribs 98 shown in Fig. 6.

Figure 7:
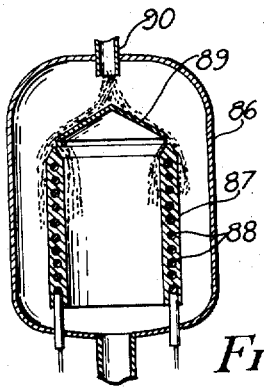
Fig. 7 is a vertical sectional view showing another type of steam generator embodying the features of the present invention.

In the form of the invention of Fig. 7, the steam generator includes an outer casing 86 within which a cylindrical heating surface 87 is suitably supported, there being a heating element 88 within the wall 87. Above the cylinder 87 a spreading cone 89 is suitably supported. Feed water from the inlet pipe 90 is intercepted by the cone and falls off of the periphery of said cone in a circular sheet, part of which flows down the inner surface of the cylinder 87 and part down the outer surface. The construction, therefore, provides a double surface steam generator.

Figure 8:
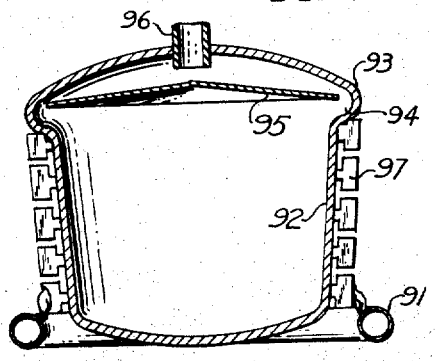
Fig. 8 is a vertical sectional view showing still another modification.

The form of the invention of Fig. 8 is similar to the form of the invention of Fig. 1, and all of the detailed features of Fig. 1 may be incorporated therein. However, a circular gas burner 91 is used to heat the receptacle 92 instead of an electric heating element. The receptacle 92 has an offset upper portion 93 providing an annular shoulder 94 for receiving water from the deflector cone 95. The feed water is deposited on the cone from an inlet pipe 96. The water flows down the interior sides of the receptacle 92 to which heat is conducted by the lugs 97, the latter being similar to the lugs in the form of the invention of Fig. 1. There is also a suitable outlet for wet steam (not shown).

OPERATION

Referring to Figs. 1, 4 and 10, when the valve 40 is opened steam flows through the dry steam line 38 to the cooker 39 or other device requiring steam. When this occurs the pressure in the steam separator 37 drops and check valves 51 and 53 close so the pressure in the feed tank 44 does not drop immediately. When the pressure in the steam generator receptacle 20 drops the pressure control switch 49 closes and opens solenoid operated valve 45 to allow water to flow into the steam generator. The throttling valve 46 is adjusted to limit the water flow to that required for efficient steam generation on the cylinder walls.

Water then flows onto the spreader cone 24 and from the spreader to the annular wall of the receptacle 20. As soon as the top portion of the annular upright wall is cooled below the "critical temperature" steam is generated on a circular line around the wall, which circular line progresses downwardly as the wall is progressively cooled. In Fig. 10 the "critical temperature" line is indicated at A approximately halfway down the wall where it will be seen that the water which has been cascading down the upright wall turns into steam just above the line A, the water boiling violently and being thrown away from the surface at the "critical temperature" line as indicated by the cloudy effect in Fig. 10. Any water which might fall back on the heating surface below the line A rolls down the surface in the form of a ball and generates very little steam. Just above "critical temperature" line A the steam generation is very rapid, up to 396,000 B.t.u. per square foot per hour. This is over ten times the rate of heat transfer in the average boiler and this is what makes it practical to us hot metal as a heat source in a steam generator.

Figure 2:
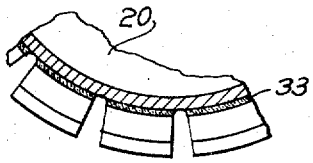
Fig. 2 is a fragmentary horizontal sectional view taken on line 2—2 of Fig. 1.

Since most of the steam is generated just above the line A on the upright heating surface, the rating of the steam generator is determined by the length of this line rather than by the area of the heating surface. Tests have shown this rating to be about 3,500 B.t.u. per hour per inch of length. The rating would vary, however, with the maximum metal temperature and also with the thickness and heat conductivity of the metal, as considerable heat is transferred by conduction from the hot metal to the cooled metal above the line A. Below the line A the metal is dry and hot. The more heat which is conducted under the line A the wider the steaming band and the slower the advance of the "critical temperature" line. The rate of downward advance of the line A is also effected by the thickness of the metal back of the heating surface as the thicker the metal the slower it will cool off. A thick metal plate which is kept relatively cool on one side of line A and relatively hot on the other side would be subjected to severe internal strains and would probably buckle or crack. With the present invention, however, the advantages of a thick metal plate are obtained through use of the lug arrangement shown in Figs. 1, 2 and 3, which is so worked out to eliminate internal strain. For a practical stored heat cylinder of the type with which the present invention is concerned the thickness of the wall of the receptacle 20 would have to be about one inch and the use of the lugs makes it possible to use such a thickness without problems.

The weight of water flowing down the cylinder must be considerably greater than the weight of the steam generated as the water which is actually converted to steam would form only a thin film on the cylinder and there would be no simple way of insuring a uniform flow down to the line A. Inasmuch as the excess water which is required to maintain a uniform flow is heated to steam temperature it would be inefficient to discard this hot water. With the present invention the steam pressure generated within the receptacle 20 serves to blow this excess water into the steam separator 37 which is then fed downwardly through the pipe 50 into the feed water tank 44 to be used as feed water in the next heating operation.

The thermostat 63 at the bottom of the steam generator prevents the water valves from feeding water into the receptacle 20 until the wall is hot enough to generate sufficient steam to blow excess water off of the bottom. If such excess water were allowed to accumulate on the bottom then it would continue to boil after the desired pressure had been reached and the safety valve 47 would blow off.

If the water level drops in the feed tank 44 the pressure above the water falls below that in the steam generator 20 and the water would stop flowing. By using the check valve 53 in the vacuum breaker line 52 this will open to keep the pressure in the feed tank at least as high as that in the generator so as to allow the water to flow down by gravity. The thermostats 57 and 58 control the temperature of the electric heating elements 35. The receptacle 20 is kept hot at all times, and when the upper part above the line A of Fig. 10 is cooled by the water the thermostat 57 turns on a heating element for the upper portion of the receptacle. When the lower portion of the receptacle is cool the thermostat 58 turns on the lower section of the heating element. The thermostat 63 at the bottom of the steam generator is in series with the pressure control switch 49 and opens to close the feed water valve 45 to stop the flow of water when the bottom of the receptacle 20 has cooled below 250° F. This prevents flooding of the bottom when the generator is too cool to generate enough steam to blow the water off of the bottom. The safety valve 47 has sufficient capacity to prevent excess pressure build up if water should accidentally flow into the hot generator when the valve 40 is closed. When the valve 40 is closed steam ceases to flow from the separator, the pressure builds up, and check valve 51 opens. Then the water in the separator 37 flows into the feed tank 44 through valve 51 to provide water for the next operation.

It is important that the head 21 of the upper portion of the cylinder adjacent the weld 28 be relatively thin so that this section will cool quickly below the "critical temperature" and allow high volume steaming to start.

The improved generator provides a large volume of steam the instant the valve 40 is opened, which steam is generated by heat drawn from hot walls of the receptacle 20. The use of hot water under pressure in the feed tank also increases steam volume, as some of this water flashes into steam as it leaves the valve 45 so that no more heat is required to bring this water to the boiling point. The main volume of steam, however, is produced as the water flows down the hot [upright] wall of the receptacle 20. When the water reaches the point where the receptacle temperature is higher than the "critical temperature" then the water is thrown away from the wall by a violent action similar to the sizzling of water on a hot iron where the water rolls in balls on the hot surface.

It is understood that the present invention is not to be limited to the exact details of construction shown and described, for obvious modifications will occur to persons skilled in the art.

What I claim is:

1. A steam generator comprising a surrounding upright wall having at least one side forming a steam generating surface, means including a water inlet for directing an annular sheet of water simultaneously onto all portions of the top of said wall to flow down said steam generating surface by gravity, said water being in a quantity in excess of that which will be converted to steam, means for heating said wall to a temperature substantially higher than that of steam to cause steam to be generated, means for collecting surplus water, and a steam discharge conduit so located with respect to said collecting means as to cause continuous removal of said surplus water by the action of the steam which is being discharged, and a steam separator in said steam discharge conduit.

2. A steam generator comprising a surrounding upright wall one side of which constitutes a steam generating surface, surrounding rows of lugs one above the other projecting from the other side, means including a water inlet for directing water simultaneously onto all portions of the top of said wall to flow down said steam generating surface by gravity, means for heating the lugs on said wall to a temperature substantially higher than that of steam to cause steam to be generated by heat conducted from said lugs to the steam generating side of the wall, and means for discharging said steam, each of said lugs being T shaped in cross-section and having a relatively massive portion and having a relatively narrow stem to conduct heat to the wall, the lugs in a row being separated from one another by vertical radial slots and the lugs of one row being separated from an adjacent row by horizontal annular slots.

3. A steam generator comprising a circular upright wall one side of which constitutes a steam generating surface, circular rows of lugs projecting from the other side, means including a water inlet for directing water simultaneously onto all portions of the top of said wall to flow down said steam generating surface by gravity, circular means surrounding said lugs for heating the lugs on said wall to a temperature substantially higher than that of steam to cause steam to be generated by heat conducted from said lugs to the steam generating side of the wall, and means for discharging said steam, each of said lugs being T shaped in cross-section and having a relatively narrow stem to conduct heat to the wall.

4. A steam generator comprising a circular upright wall having a side which constitutes a steam generating surface, a conical water spreader supported above said wall and having an apex and having a peripheral portion to direct an annular sheet of water from the spreader onto the steam generating surface, means for feeding water onto the apex of said water spreader to flow uniformly over the latter, means for heating said wall to a temperature substantially higher than that of steam to cause steam to be generated by said steam generating surface, the amount of water being in excess of that which will be converted into steam, means for collecting said excess water, and means for discharging said generated steam, so located with respect to said collecting means as to cause continuous removal of said collected excess water by the steam which is being discharged through said discharge means, and a steam separator to which said discharge means is connected.

5. A steam generator comprising an upright wall having a side which constitutes a steam generating surface, inlet means for directing a sheet of water onto the top of said wall to flow simultaneously down all portions of the upper part of the generating side of the wall by gravity, said water being in excess of that which will be converted into steam, means for heating said wall to a temperature substantially higher than that of steam to cause steam to be generated, means for collecting said excess water, a steam discharge conduit so located with respect to said collecting means as to cause continuous removal of said excess water by the steam which is being discharged, a steam separator in said steam discharge conduit, a feed-water tank, means for supplying make up water to said feed-water tank, means for conducting separated water from the separator to the feed tank, and means for conducting water from the feed tank to the inlet means.

6. A steam generator comprising a circular upright wall having its inner side constituting a steam generating surface, spaced lugs projecting from its outer side, means including a feed water inlet for directing an annular sheet of water simulaneously onto all portions of the top of the inner side of said wall to flow down said steam generating surface by gravity, means for heating the lugs on said wall to a temperature substantially higher than that of steam to cause steam to be generated by heat conducted from said lugs to the inner side of the wall, and means for discharging said steam.

7. A steam generator comprising a circular upright wall having its outer side constituting a steam generating surface, spaced lugs projecting from its inner side, means including a feed water inlet for directing an annular sheet of water simultaneously onto all portions of the top of the outer side of said wall to flow down said steam generating surface by gravity, means for heating the lugs on said wall to a temperature substantially higher than that of steam to cause steam to be generated by heat conducted from said lugs to the outer side of the wall, and means for discharging said steam.

8. A steam generator comprising a circular upright wall having both sides constituting steam generating surfaces, a conical water spreader supported above said wall and having a periphery position to direct an annular sheet of water from the spreader onto both sides of said wall, means for feeding water onto said water spreader, means for heating said wall to a temperature substantially higher than that of steam to cause steam to be generated by said steam generating surfaces, and means for discharging said generated steam.

9. A steam generator comprising a closed receptacle having a circular upright wall, the inner portion of said upright wall constituting a steam generating surface, spaced lugs projecting from the outer side of said wall, means including a feed water inlet in said receptacle for directing an annular sheet of water simultaneously onto all portions of the upper part of the inner side of said wall to flow down said steam generating surface by gravity, said water being in a quantity in excess of that which will be converted into steam, means for heating the lugs on said wall to a temperature substantially higher than that of steam to cause steam to be generated by heat conducted from said lugs to the inner side of said wall, the bottom of said receptacle constituting means for collecting said excess water, and means for discharging steam from the bottom of said receptacle to cause said excess water to be removed by the steam.

10. A steam generator comprising a circular upright wall one side of which constitutes a steam generating surface, circular rows of lugs projecting from the other side, one row being above another, means including a water inlet for directing an annular sheet of water simultaneously onto all portions of the top of said wall to flow down said steam generating surface by gravity, said rows of lugs having annular grooves therein, rod type electric heating elements in said grooves for heating the lugs to a temperature substantially higher than that of steam to cause steam to be generated by heat conducted from said lugs to the steam generating side of the wall, and means for discharging said steam.

11. A method of generating steam comprising initially heating an upright metal wall to a temperature above the critical temperature for steam generation, flowing a sheet of water onto all portions of the top of at least one side of said wall to gravitate downwardly thereon and progressively cool the wall in a downward direction, and controlling the quantity of water so that water covers the portion of the wall which has been cooled to a temperature under the critical temperature for steam generation to cause the critical temperature line to progress slowly downwardly while steam is being generated adjacent the critical temperature line and so that excess water is thrown off of the wall at said critical temperature line.

12. A stored heat steam generator comprising a surrounding upright wall having at least one side forming a steam generating surface, means for initially heating said wall to a temperature above the critical temperature for steam generation, means for directing a sheet of water onto all portions of the top of said side of the wall to gravitate downwardly thereon and progressively cool said side, means for controlling the quantity of water so that water covers the portion of the wall which is cooled to a temperature under the critical temperature for steam generation to cause the critical temperature line to progress downwardly, and means for discharging the generated steam and the excess water thrown off the wall at the critical temperature line.

13. A stored heat steam generator comprising a surrounding upright wall having a side forming a steam generating surface, heat storage lugs projecting from the opposite surface, means for heating said lugs so that the latter may conduct heat to said steam generating surface to initially raise the temperature of the latter above the critical temperature for steam generation, means for directing a sheet of water onto all portions of the top of said side of the wall to gravitate downwardly thereon and progressively cool said surface, means for controlling the quantity of water so that water covers the portion of the wall surface which is cooled to a temperature just under the critical temperature for steam generation to cause the critical temperature line to progress downwardly on the wall, and means for discharging the generated steam and the excess water thrown off the wall at the critical temperature line.

14. A stored heat steam generator comprising a surrounding upright wall having a side forming a steam generating surface, heat storage lugs projecting from the opposite surface, electric heating means in contact with said lugs so that the latter may conduct heat to said steam generating surface to initially raise the temperature of the latter above the critical temperature for steam generation, means for directing a sheet of water onto all portions of the top of said side of the wall to gravitate downwardly thereon and progressively cool said surface, means for controlling the quantity of water so that water covers the portion of the wall surface which is cooled to a temperature just under the critical temperature for steam generation to cause the critical temperature line to progress downwardly on the wall, and means for discharging the generated steam and the excess water thrown off the wall at the critical temperature line.

*15. A method for generating steam comprising initially heating a metal wall to a temperature above the critical temperature for steam generation, disposing said wall so that there is a top and so that water will flow downwardly from said top by gravity, flowing a sheet of water onto all portions of the top of at least one side of said wall to gravitate downwardly thereon and progressively cool the wall in a downward direction, and controlling the quantity of water so that water covers the portion of the wall which has been cooled to a temperature under the critical temperature for steam generation to cause the critical temperature line to progress slowly downwardly while steam is being generated adjacent the critical temperature line and so that excess water is thrown off of the wall at said critical temperature line.*

*16. A stored heat steam generator comprising a wall having at least one side forming a steam generating surface, said wall being disposed to provide a top and to provide for flow of water downwardly from said top, means for initially heating said wall to a temperature above the critical temperature for steam generation, means for directing a sheet of water onto all portions of the top of said side of the wall to gravitate downwardly thereon and progressively cool said side, means for controlling the quantity of water so that water covers the portion of the wall which is cooled to a temperature under the critical temperature for steam generation to cause the critical temperature line to progress downwardly, and means for discharging the generated steam and the excess water thrown off the wall at the critical temperature line.*

*17. A stored heat steam generator comprising a wall having a side forming a steam generating surface, said wall being disposed to provide a top and to provide for flow of water downwardly from said top, heat storage lugs projecting from the opposite side, means for heating said lugs so that the latter may conduct heat to said steam generating surface to initially raise the temperature of the latter above the critical temperature for steam generation, means for directing a sheet of water onto all portions of the top of said side of the wall to gravitate downwardly thereon and progressively cool said side, means for controlling the quantity of water so that water covers the portion of the wall which is cooled to a temperature just under the critical temperature for steam generation to cause the critical temperature line to progress downwardly on the wall, and means for discharging the generated steam and the excess water thrown off the wall at the critical temperature line.*

*18. A stored heat steam generator comprising a wall having a side forming a steam generating surface, said wall being disposed to provide a top and to provide for flow of water downwardly from said top, heat storage lugs projecting from the opposite side, electric heating means in contact with said lugs so that the latter may conduct heat to said steam generating surface to initially raise the temperature of the latter above the critical temperature for steam generation, means for directing a sheet of water onto all portions of the top of said side of the wall to gravitate downwardly thereon and progressively cool said surface, means for controlling the quantity of water so that water covers the portion of the wall surface which is cooled to a temperature just under the critical temperature for steam generation to cause the critical temperature line to progress downwardly on the wall, and means for discharging the generated steam and the excess water thrown off the wall at the critical temperature line.*

References Cited in the file of this patent or the original patent

UNITED STATES PATENTS

| | | |
|---|---|---|
| 377,228 | Bartlett | Jan. 31, 1888 |
| 1,782,171 | Lattner | Nov. 8, 1930 |
| 2,170,551 | Cummings | Aug. 22, 1939 |
| 2,442,281 | Arant | May 25, 1948 |